E. J. SWEETLAND.
FILTER.
APPLICATION FILED APR. 30, 1919.
1,432,134.
Patented Oct. 17, 1922.
7 SHEETS—SHEET 1.
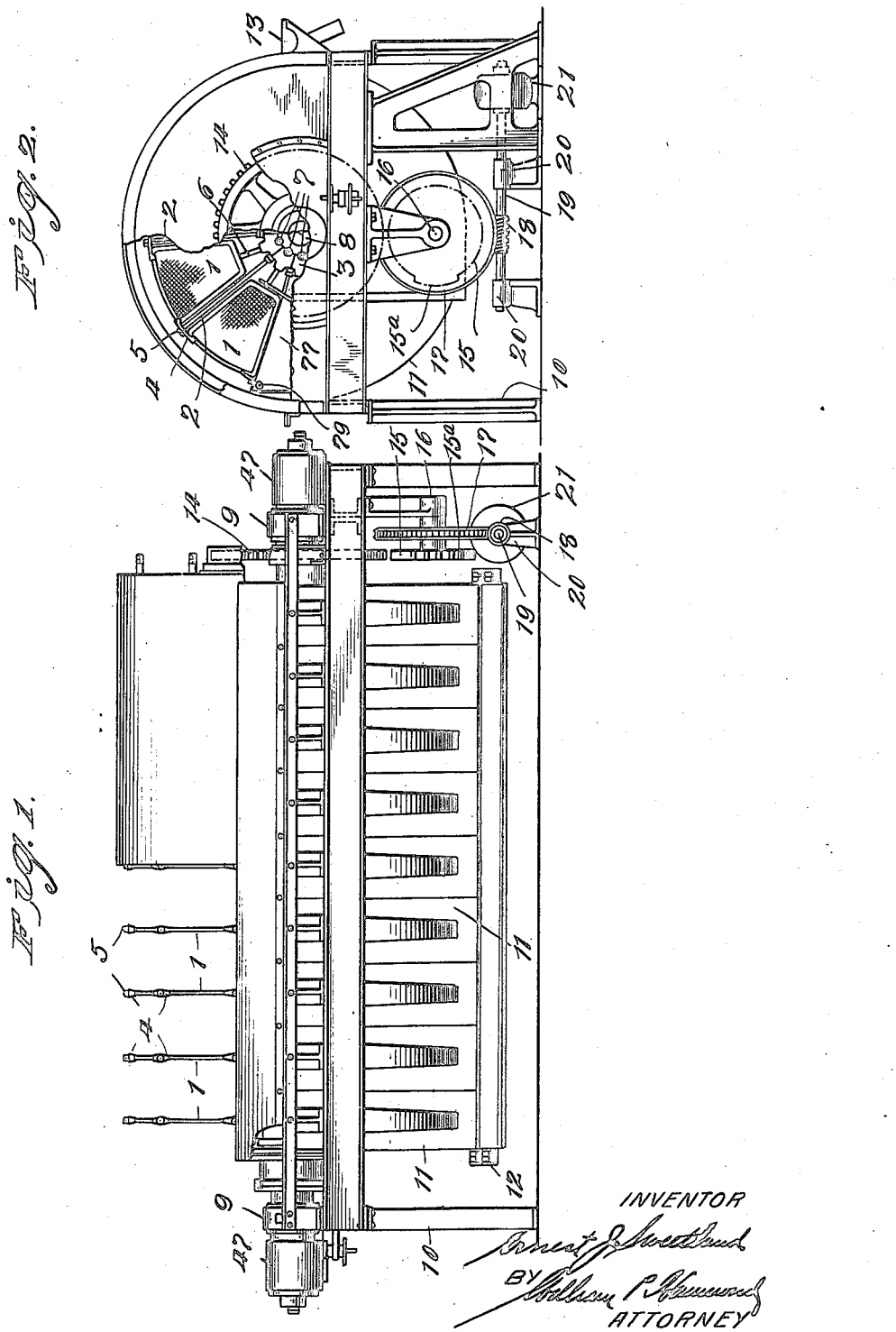
INVENTOR
Ernest J. Sweetland
BY
ATTORNEY

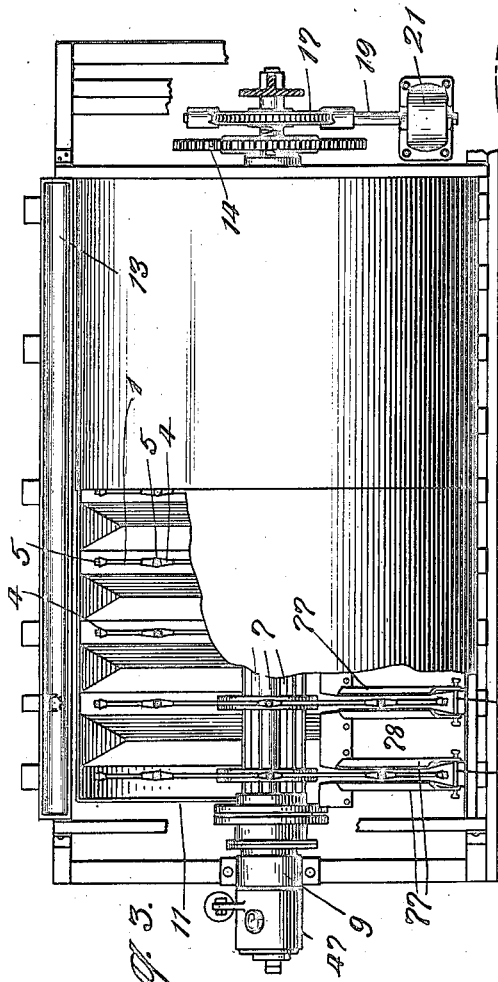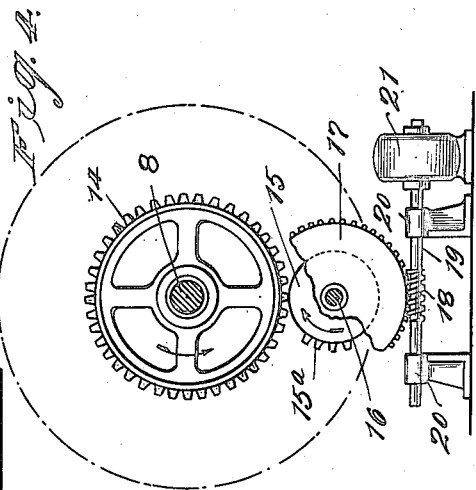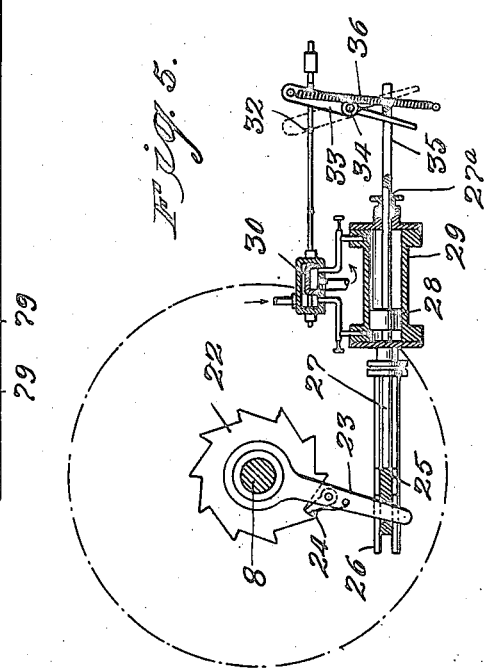

E. J. SWEETLAND.
FILTER.
APPLICATION FILED APR. 30, 1919.
1,432,134.
Patented Oct. 17, 1922.
7 SHEETS—SHEET 3.
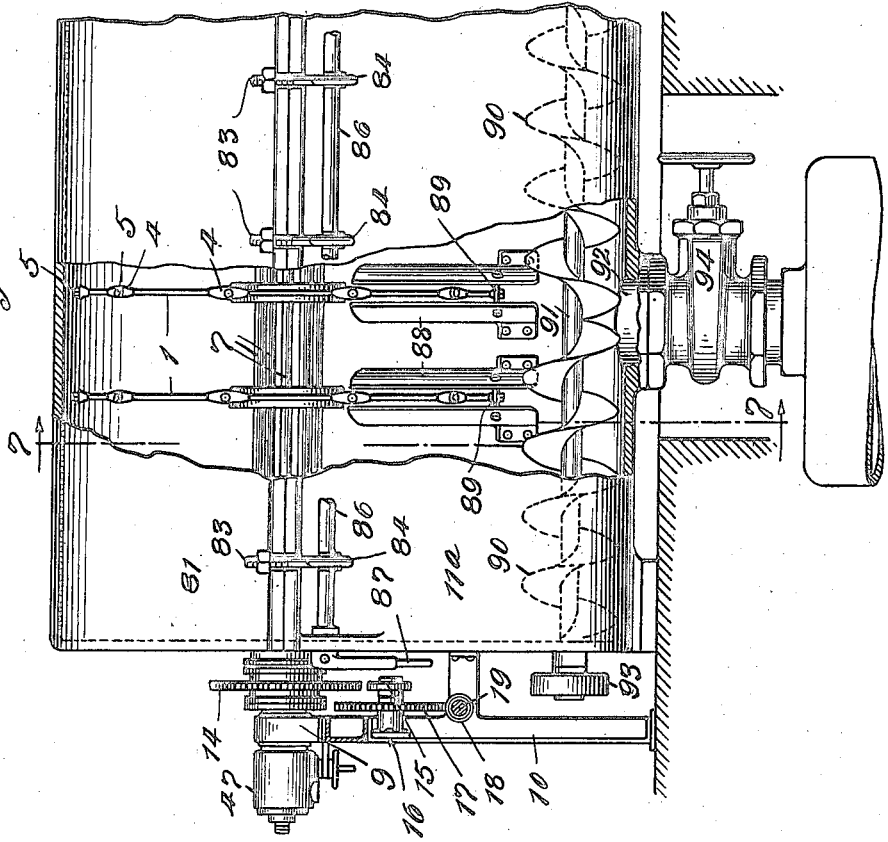
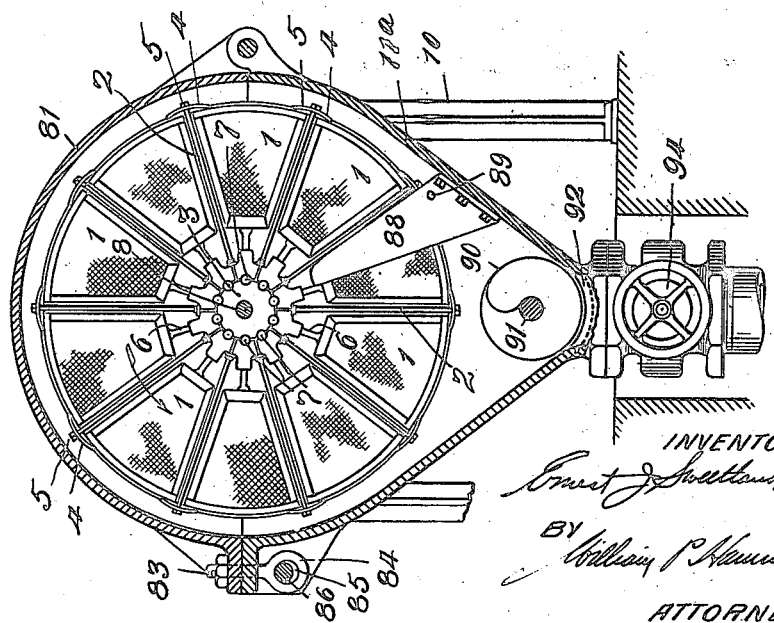
INVENTOR
Ernest J. Sweetland
BY William P. Hammond
ATTORNEY E. J. SWEETLAND.
FILTER.
APPLICATION FILED APR. 30, 1919.
1,432,134.
Patented Oct. 17, 1922.
7 SHEETS—SHEET 4.
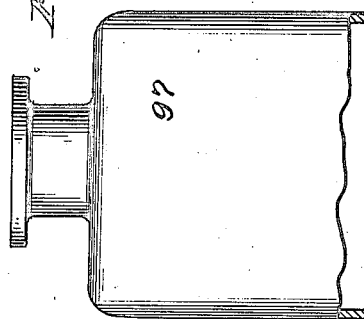
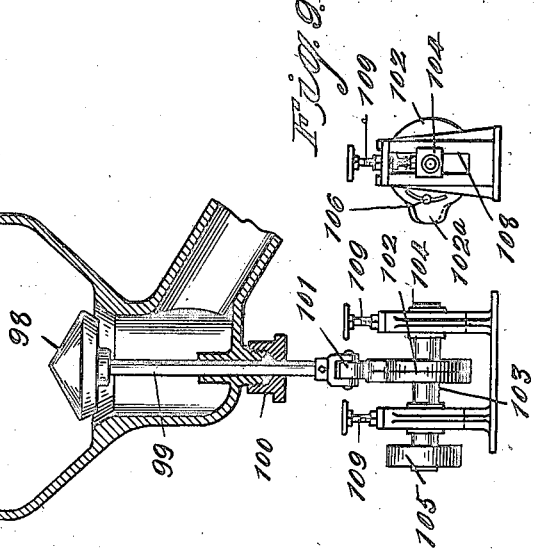
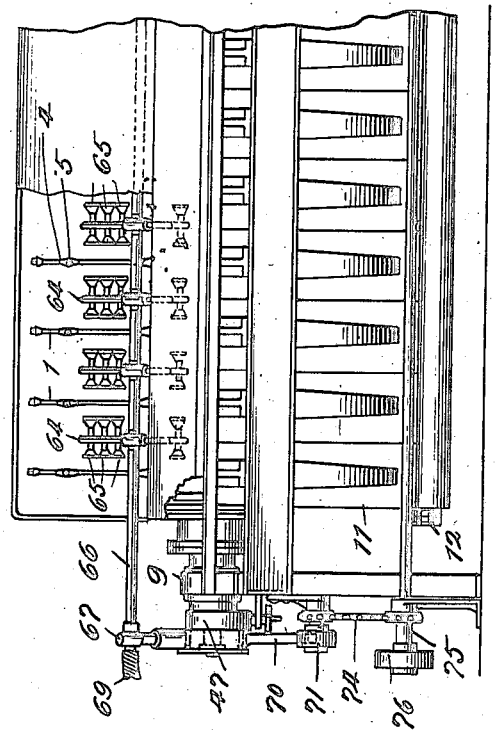
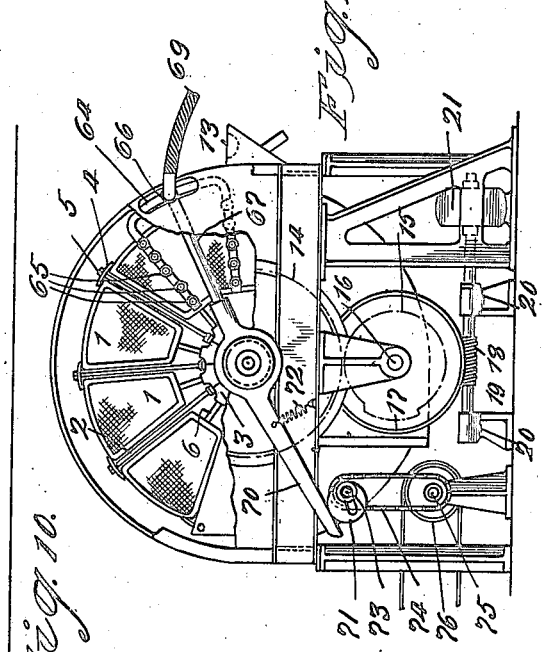
INVENTOR
Ernest J. Sweetland
BY William P. Hammond
ATTORNEY

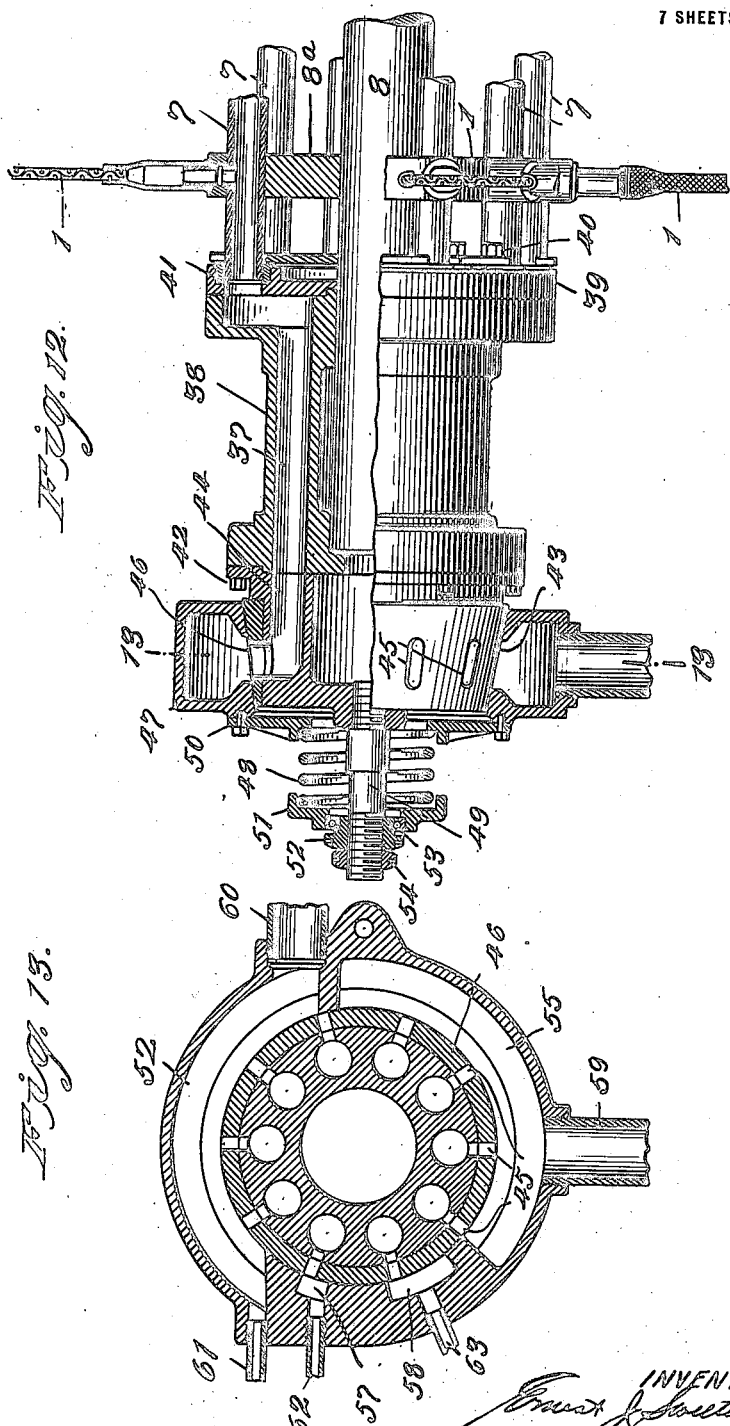

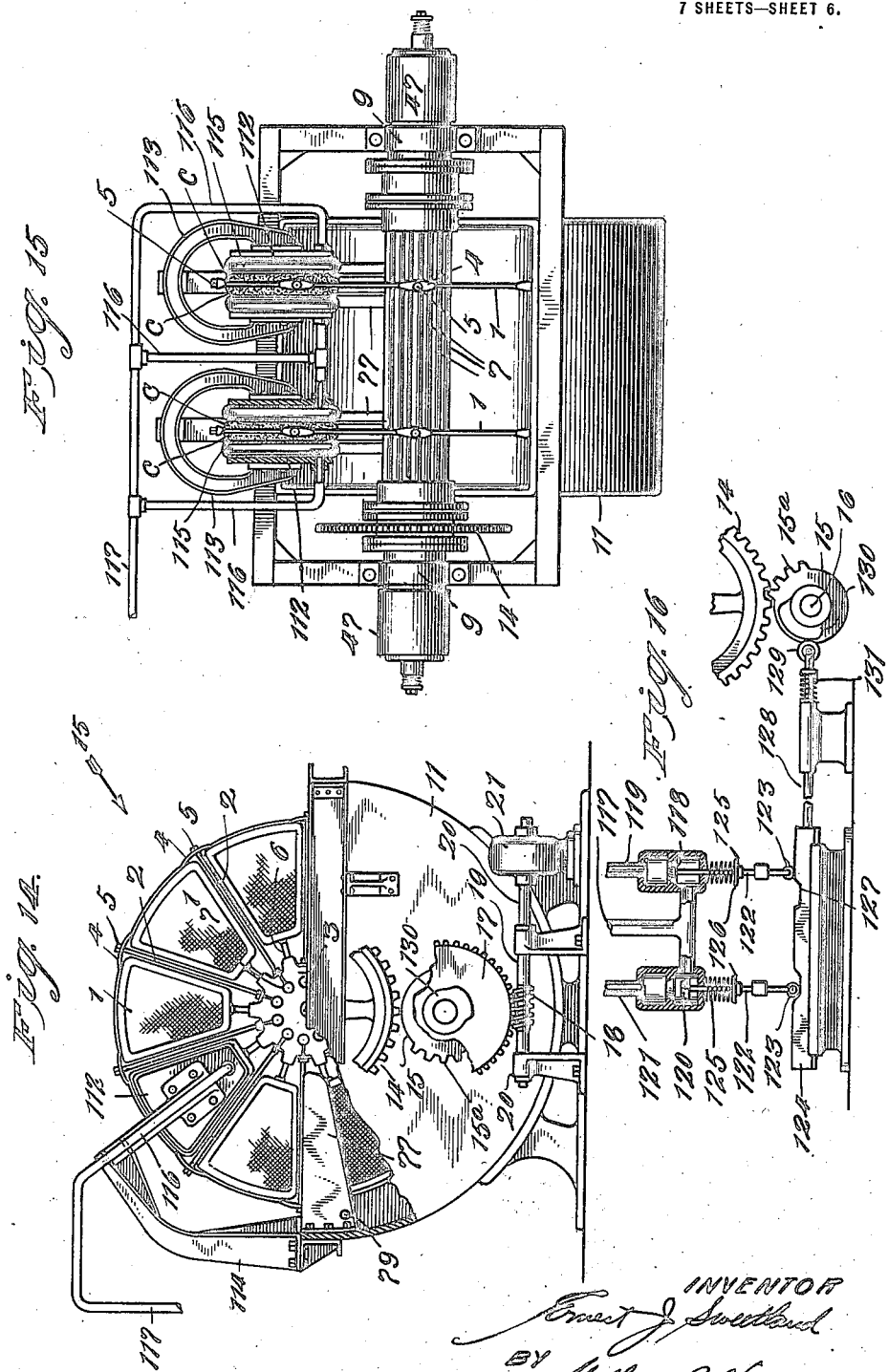

E. J. SWEETLAND.
FILTER.
APPLICATION FILED APR. 30, 1919.
1,432,134.
Patented Oct. 17, 1922.
7 SHEETS—SHEET 7.
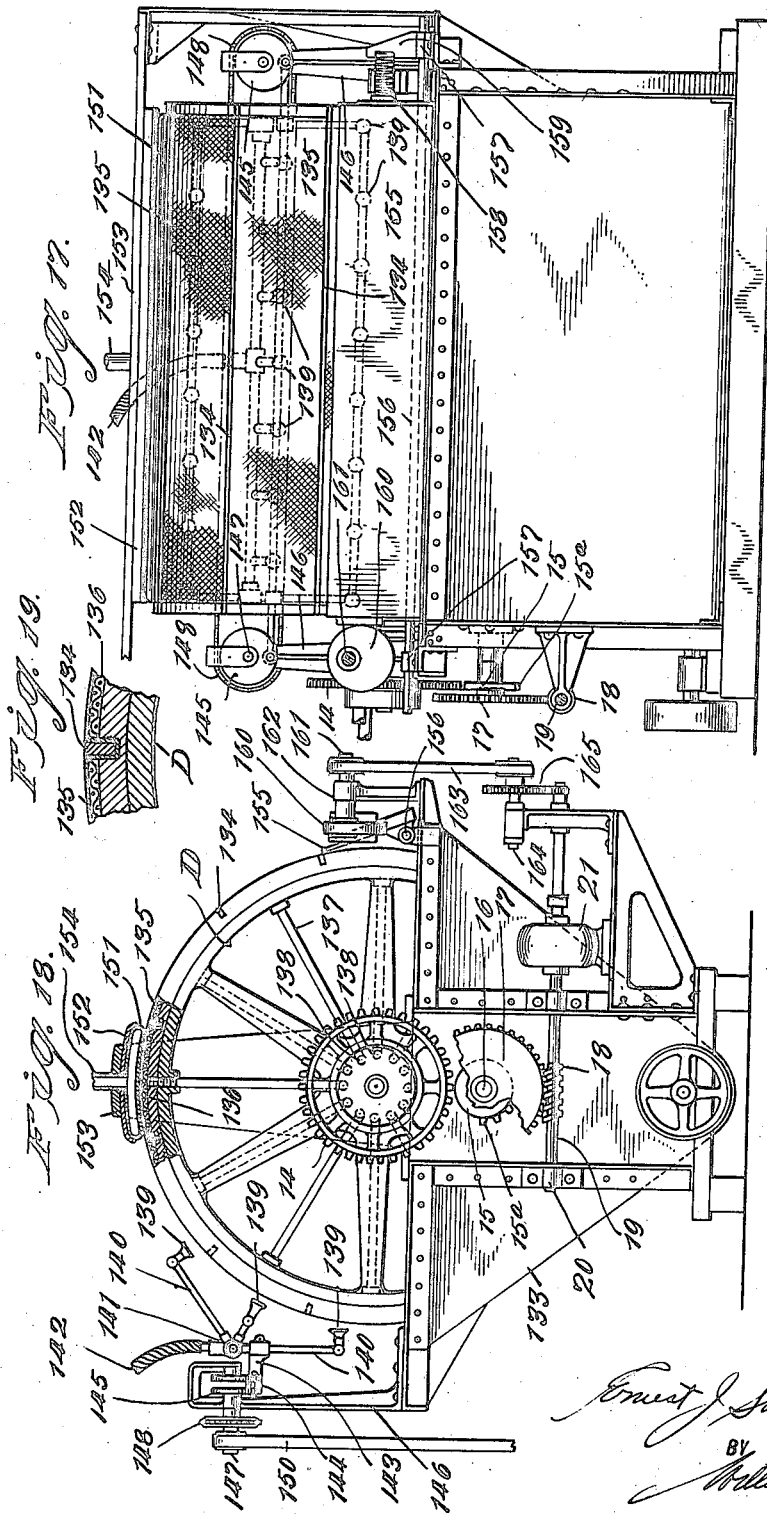

Patented Oct. 17, 1922.

1,432,134

UNITED STATES PATENT OFFICE.

ERNEST J. SWEETLAND, OF MONTCLAIR, NEW JERSEY.

FILTER.

Application filed April 30, 1919. Serial No. 293,673.

*To all whom it may concern:*

Be it known that I, ERNEST J. SWEETLAND, a citizen of the United States, residing in Montclair, county of Essex, and State of New Jersey, have invented certain new and useful Improvements in Filters, of which the following is a specification.

The present invention relates to certain new and useful improvements in the construction of suction filters, and has for its object to provide a device of this character which embodies novel features of construction whereby increased efficiency and greater capacity can be obtained, and which also provides for removing the moisture content from the sludge or cake to a point that has never been approached in other suction filters and which, so far as moisture content is concerned, will compare favorably with the very best plate and frame filter practice.

In the plate and drum types of rotary suction filters which have been previously used, it is the universal practice to rotate the filter elements at a slow uniform speed, sometimes as slow as one revolution in ten or twelve minutes. According to the present invention, the filter element is rotated with an intermittent movement and permitted to remain stationary for an appreciable period of time between the movements thereof. If there are ten segments or filter areas in the disk or drum, and the disk or drum is timed to make one complete revolution in ten minutes, each segment or filter area might be timed to advance one step in each minute. This might be arranged so that each movement would require a period of about ten seconds, after which the filter would remain stationary for fifty seconds. A reverse flow of compressed air is ordinarily passed through each segment or filter area as the cake is removed therefrom, and according to the present construction this flow of compressed air will only be necessary for a period of ten seconds, thereby very greatly reducing the compressed air consumption and obtaining a filter of increased capacity.

The present invention further contemplates a mounting of the spraying nozzles whereby they are oscillated or moved and relative motion obtained between the nozzles and the filter members, even though the leaves or drum may be at rest. The spray from the nozzles is thus distributed over the filter areas and an even wash accomplished.

A further important feature of the invention is the utilization of pressure to expel the moisture from the cake or sludge preparatory to the discharge thereof. One of the greatest draw-backs to the use of suction filters has always been that it is impossible to get the cake as dry by suction as it can be obtained in pressure filters, and in many instances it has been impossible to effect the sale of suction filters on this account. The intermittent motion of the filter enables pressure to be applied directly to the filter cake during those periods when the filter is at rest, and any suitable mechanical, pneumatic or hydraulic means may be utilized for subjecting the cake to pressure while still in position upon the filter and reducing the moisture content thereof to the lowest possible point. One of the great objections to suction filters is removed by this invention.

The invention also contemplates the provision of removable and interchangeable scrapers which can be replaced as frequently as necessary without delay and inconvenience.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawings, in which :—

Figure 1 is a side elevation of a filter of the leaf type which is constructed in accordance with the invention, a portion of the top hood being removed.

Figure 2 is an end view thereof with portions broken away.

Figure 3 is a top plan view of the filter, portions being broken away.

Figure 4 is a detail view of the drive gearing for imparting an intermittent rotary movement to the filter leaves.

Figure 5 is a similar view, partly in section, showing a mechanism adapted to be driven by a fluid pressure medium such as compressed air for imparting an intermittent rotary movement to the filter leaves.

Figure 6 is a side elevation of one end of a modified form of filter, having features of the invention embodied therein.

Figure 7 is a transverse sectional view on the line 7—7 of Figure 6, looking in the direction of the arrows.

Figure 8 is a detail view, partly in section, showing a cam operated valve construction for controlling the sludge discharge from a filter of the type shown by Figures 6 and 7.

Figure 9 is a detail view of the adjustable cam member utilized in the construction of Figure 8.

Figure 10 is a side elevation of one end of a leaf filter provided with movably mounted spraying nozzles, a portion of the casing being broken away.

Figure 11 is an end elevation thereof, portions of the casing being broken away.

Figure 12 is an enlarged side elevation of one of the valve devices which are arranged at the ends of the shafts to provide for the discharge of the filtrate and wash water as well as the supply of compressed air to the different segments or filter areas at proper intervals of time in the operation of the filter.

Figure 13 is a transverse sectional view on the line 13—13 of Figure 12.

Figure 14 is an end elevation of an intermittently driven leaf filter provided with means for subjecting the cake or sludge to pressure to expel the moisture therefrom, portions of the casing being broken away.

Figure 15 is a top plan view thereof.

Figure 16 is a detail view of the valve mechanism for automatically supplying compressed air to the pressure bags or exhausting the same at proper intervals of time in the operation of the filter.

Figure 17 is a side elevation of a suction filter of the drum type which embodies the invention.

Figure 18 is an end elevation thereof, portions being broken away and shown in section.

Figure 19 is a fragmentary sectional view through a portion of the periphery of the drum, showing one of the retaining strips which are utilized to hold the filter fabric in position upon the drum.

Corresponding and like parts are referred to in the following description and indicated in all the views of the drawings by the same reference characters.

In Figures 1, 2 and 3 of the drawings certain features of the invention are shown as embodied in a suction filter of the leaf type. Each filter leaf is shown as having a composite formation and as being constructed in a series of independent segments or sections 1 which are arranged and secured between rods 2 projecting radially from a hub 3. The outer edges of the filter leaf segments 1 are engaged by clips 4 which are secured in position by nuts 5 threaded on the outer ends of the rods 2. The inner ends of the filter leaf sections 1 are formed with nipples or short pipes 6 which are seated in openings in the hub 3, being held in a water-tight engagement therewith by the action of the clips 4, and communicating through the hub with longitudinal pipes 7. These pipes 7 are arranged in a group around the main shaft 8 and have a parallel relation to the said shaft and to each other. The specific construction of this sectional filter leaf is now well-known in the art and does not constitute any part of the present invention.

The main shaft 8 is journaled in bearings 9 at the ends of the supporting frame 10, and when the filter is in operation the lower portion of each filter leaf is partially or entirely submerged in the filter tank 11. As indicated by Figures 1 and 2 the bottom walls of this filter tank may have a crenellated formation, thereby providing separate wells or depressions for the filter leaves. The material to be filtered may be introduced to the filter tank through a manifold 12 at the bottom thereof, and the level of the material within the tank may be such as to overflow into a trough 13 at one side thereof. It has previously been the practice to rotate the filter leaves slowly and continuously and to provide for obtaining a filtering operation while the different segments are submerged, the segments being sprayed and cleaned while they are above the level of the liquid contents of the filter tank.

According to the present invention, instead of imparting a continuous rotary movement to the filter leaves, they are advanced by an intermittent or step by step movement. Many different mechanical means or agencies are suspectible of being utilized for obtaining this result. In Figures 1 to 4 inclusive a gear wheel 14 is mounted upon one end of the shaft 8 and arranged to mesh with a mutilated gear 15 mounted upon a countershaft 16. A worm gear 17 is also rigid with the countershaft 16 and meshes with a worm 18 on a worm shaft 19 which is journaled within suitable bearings 20 and driven by a suitable motor 21. With this arrangement of the gearing it will be obvious that the worm wheel 17 and mutilated gear 15 will have a slow continuous rotary movement, and that each revolution of the mutilated gear will cause the teeth 15$^a$ thereof to mesh with the main gear 14 and advance the filter leaves one step. The relation of the members is such that this step by step movement of the filter leaves will cause each filter leaf segment to occupy the position previously occupied by the filter leaf segment in advance thereof. In Figure 5 is illustrated another mechanism for obtaining this step by step or intermittent movement of the filter leaves. A ratchet wheel 22 is applied to the shaft 8, and a lever 23 which is loose upon the shaft carries a pawl 24 which engages the teeth of the ratchet wheel. The free end of the lever 23 passes loosely through an opening in a cross head 25 which is mounted to reciprocate within guideways 26. A piston rod 27 connects the cross head to a piston 28 in a cylinder 29. A conventional slide valve 30 is provided for controlling the admission and exhaust of some fluid pressure medium such as compressed air to and from the opposite ends of the cylinder 29. The stem 31 of the slide valve is provided with a pair of projections 32 which are arranged on opposite sides of a snap lever 33, said lever being pivoted between its ends at 34, and also projecting into an opening 35 in a rearward extension 27ª of the piston rod 27. A tension spring 36 is arranged to swing the lever 33 in opposite directions from a dead center position. When the piston 28 reaches either limit of its movement, one end of the slot 35 in the piston rod extension 27ª will engage the lower end of the lever 33 and swing the same a sufficient amount to bring the tension of the spring 36 on the other side of the pivot 34, whereupon the spring will complete the shifting movement of the lever with a quick action and reverse the position of the slide valve. The piston will thus be moved back and forth in the cylinder in the usual manner, and the pawl 24 will be caused to cooperate with the ratchet wheel 22 to impart a step by step rotary movement to the shaft 8 and filter leaves mounted thereon.

The longitudinal pipes 7 (see Figures 12 and 13) which are grouped around the main shaft 8, being supported by spiders or hub members 8ª thereon, communicate at their ends with longitudinal openings or passages 37 in sleeves 38 which are journaled within the bearings 9 shown in Figure 1. The inner ends of the sleeves 38 have plates 39 secured thereto in any suitable manner as by means of the bolts 40, said plates being formed with openings receiving the pipes 7, and packing 41 being shown as provided to insure tight joints. The outer end of each sleeve 38 is secured by fastening means such as the bolts 42 to a tapered or conical valve member 43 which is provided with corresponding passages 44. These passages communicate with ports 45 opening laterally through the tapered surface of the valve member, and a removable facing 46 which can be readily replaced in the event of wear is shown as extending around the valve member. An annular housing or casing 47 is provided with a tapered interior seat with which the valve member is held in engagement by the action of a spring 48. This spring surrounds a stem 49 projecting axially from the valve member, and is interposed between an inner plate 50 applied to the annular housing 47, and an outer plate 51 which bears against a nut 52 threaded upon the outer end of the stem 49. An anti-friction bearing 53 is shown as interposed between the nut and the plate, and a lock nut 54 is also shown as threaded upon the stem and jammed against the nut 52. The annular housing 47 has a hollow interior which is subdivided into a lower chamber 55, an upper chamber 56, and smaller side chambers 57 and 58. The lower chamber 55 communicates with a comparatively large pipe 59 through which the filtrate is withdrawn, the arrangement being such that the ports 45 of the respective pipes 7 grouped about the main shaft 8 communicate with the chamber 55 during the period or intervals of time during which the corresponding segments 1 of the filter leaves are submerged in the filter tank and operating upon the contents thereof to separate the fluid from the solid particles in the usual and well-known manner. The upper chamber 56 communicates at one side with a pipe 60 through which the wash water can be removed by suction and also with a small pipe 61 through which compressed air can be admitted if desired, although, during ordinary operation this pipe will not be employed. The chamber 57 communicates with a pipe 62 through which the filter sections are placed in communication with a vacuum chamber while the cake thereon is being subjected to positive pressure. The chamber 58 communicates with a pipe 63 through which compressed air is admitted to the filter sections while the cake or sludge is being scraped therefrom. It will be understood that the cycle of operation for a filter leaf section during each rotation thereof is as follows: first, filtering; second, washing; third, drying; and, fourth, discharging. During the filtering period, the ports 45 of the filter sections communicate with the chamber 55 of the valve casing 47 and the filter leaf sections are acted upon by suction to separate the liquid from the solid contents of the filter, the filtrate passing through the filter leaf sections and being discharged through the pipe 59, while the solid particles collect upon the outside of the filter leaf section in the form of a cake. When the filter leaf section is rotated above the fluid in the filter tank, they are sprayed or washed, and the ports 45 then communicate with the chamber 56 of the valve casing or housing 47, and the filter leaf sections are again acted upon by suction, so that the wash water is drawn through the cake and discharged through the pipe 60. During the drying of the filter leaf section, the corresponding port 45 communicates with the chamber 57 and the filter leaf is under the action of suction. During the discharge or removal of the cake the port 45 is in communication with the chamber 58 and compressed air is admitted to the filter leaf section to partially inflate the same. This completes the cycle of operation, and the filter leaf is then again ready to be submerged in the tank to repeat the filtering operation.

Figures 10 and 11 illustrate a possible arrangement of nozzles for spraying the filter leaf sections as they emerge from the filter tank. A frame 64 which may be arched or U-shaped, as indicated on the drawing, projects into the space between each adjacent pair of filter leaves, the arms of the frame being provided with nozzles 65 which project outwardly in opposite directions therefrom and are arranged to play upon the faces of the filter leaves. These frames 64 are carried by and communicate with a longitudinal pipe 66 which is arranged beyond the periphery of the filter leaves, being supported at its ends by arms 67 projecting from collars 68 which are mounted concentric with the axis of the main shaft. A flexible supply pipe 69 communicates with the pipe 66 and provides a supply of wash water for all of the nozzles 65. The collars or sleeves 68 are provided with radial tail pieces 70 which are held yieldingly in engagement with cams 71 by means of springs 72. The cams are mounted upon a shaft 73 which may be driven in any suitable manner, being shown as having a chain and sprocket connection 74 with a shaft 75 which is driven by a belt and pulley 76. With this construction it will be obvious that the rotation of the cams 71 will result in oscillating the collars 68 and moving the nozzle frames 64, thereby bringing about a relative movement between the spraying nozzles and the filter leaf sections, even though the latter may be stationary. This enables the jets of wash water to be distributed evenly over the entire surfaces of the filter leaf sections, so that none of the advantages incident to a constant relative movement between the nozzles and the filter leaf elements is lost by moving the filter leaves intermittently instead of continuously.

After being washed the cake upon the filter leaves is dried, and with the filter construction illustrated by Figures 1 to 11 of the drawings this drying is caused by suction, the moisture content of the cake being reduced to as low a point as possible in this manner. The cake is then removed from the filter leaf sections by means of scrapers 77 which are arranged at each side of the leaves. These scrapers 77 are flexible and are preferably removable so that they can be replaced whenever necessary. The outer ends of the scrapers are shown as adjustably held together by means of bolts 79, and when a filter leaf section is brought into position for engagement with these scrapers 77, compressed air is admitted to such section by the valve mechanism previously described and illustrated by Figures 12 and 13. This compressed air partially inflates the filter leaf section and causes the filter fabric to bulge outwardly so that the scrapers will act effectively thereon to remove the cake from the filter cloth without injuring the latter. This cake will be discharged through spaces 78 between the filter leaves. When the filter leaf is mounted for slow continuous rotary movement, as has hitherto been the practice, it will be obvious that a much greater length of time is required to move each filter leaf section through the scrapers than where the filter leaves have an intermittent motion, and the intermittent motion results in a great saving in compressed air without detracting in any manner from the efficiency of the filter.

Figures 6 and 7 illustrate a modified form of filter which has certain features of the invention embodied therein. The filter leaves have the same construction which has been previously described, and the mutilated gear construction illustrated by Figure 4 is utilized to impart an intermittent rotary movement to the filter leaves. The cover or upper half 81 of the shell has one side thereof hingedly connected at 82 to the filter tank, while the other side thereof is flanged and engaged by clamping bolts 83. The lower ends of these bolts terminate in eyes 84 which are engaged by cams 85 on a cam shaft 86 extending longitudinally along the exterior of the casing. A hand lever 87 at one end of the cam shaft provides a convenient means for rotating the same to release or tighten the clamping bolts 83, thereby obtaining a quick and effective action. This, however, constitutes no part of the present invention, and is merely explained in order that the illustrated construction may be understood. The filter leaves are rotated with an intermittent movement through the liquid contents of the tank 11ª, and flexible scraper arms 88 project inwardly from the filter tank upon opposite sides of the filter leaves so that edge portions thereof will operatively engage the same. Bolts 89 adjustably connect the scraper blades 88 and enable the same to be moved toward or away from the filter leaves in order to be properly positioned to act in the most effective manner thereon. The sludge at the bottom of the filter tank 11ª is moved by the oppositely pitched screws 90 on the screw shaft 91 toward a central discharge opening 92. A pulley 93 is shown as provided for driving the screw shaft 91, and the outlet 92 is controlled by a valve 94. From the discharge opening 92 the sludge is deposited in a chamber 97 such as that shown by Figure 8. The discharge from this chamber is periodic, being controlled by a poppet valve 98. The stem 99 of this valve is shown as extending downwardly through a stuffing box 100 and provided with a roller 101 which rides upon a cam 102. This cam is rigid with a shaft 103 which is journaled within bearings 104 and provided with a pulley 105 by means of which it can be driven in a timed relation to the other filter mechanism. The cam 102 is shown as formed in two sections or halves which have a pin and slot connection 106, as shown by Figure 9. Each half of the cam is formed with a cam element 102ª, and by properly adjusting the two halves of the cam these cam elements 102ª can be brought into such a relation to each other as to partially or entirely overlap each other and provide a short or a long cam. This enables the cam to be adjusted for holding the valve 98 in an open position for a longer or a shorter period of time, as may be desired. The bearings 104 are shown as vertically movable within slotted standards 108, and as being connected to adjusting screws 109 by means of which they can be raised and lowered. It will be quite obvious that other mechanical means can be employed to obtain these results when carrying out the invention.

In Figures 14, 15 and 16 is illustrated one possible construction for subjecting the cake to positive pressure while in position upon the filter leaf for the purpose of reducing the moisture content of the cake to the lowest possible point before the cake is removed from the filter leaves by the scrapers. In the previous constructions of vacuum or suction filters the continuous rotary movement of the filter leaves rendered it necessary to depend upon the suction or vacuum action for removing the moisture from the cake, and one of the great drawbacks to the use of these filters has been the inability to remove as much of the moisture content of the cake as is desired during the short period of time permitted for that purpose. According to the present invention the filter leaf is stationary for an appreciable period of time between each step by step movement thereof, and during the intervals of time when the filter leaf is stationary, pressure is applied to the cake for the purpose of expelling the moisture therefrom. This is believed to be broadly new, and it is obvious that many different constructions may be utilized for carrying out the idea of the invention. One possible means for accomplishing this result is illustrated by Figures 14 and 15. Fixed plates 112 are arranged on opposite sides of each filter leaf, said plates being carried by and rigidly connected to U-shaped frames 113 which span the filter leaves and are supported by the brackets 114. These parts may be ribbed and flanged in the necessary manner to impart sufficient strength thereto to withstand heavy strains. Each of the pressure plates 112 is shown as being of a size and shape corresponding to one of the filter leaf sections 1, although it will be obvious that these pressure plates may be of any desired shape and size, and may be arranged to extend over a plurality of the filter leaf sections, if such is found desirable. A flexible bag 115 is mounted upon the inner face of each of the pressure plates 112 and these bags are connected by branch pipes 116 to a main pipe 117 which is alternately placed in communication with a pressure medium supply pipe or an exhaust pipe, thereby inflating or collapsing the flexible bags as the case may be. These flexible bags are either partially or entirely water-tight, and may be made of any suitable material such as heavy canvas or reinforced rubber. Compressed air may be used for inflating the bags, and automatic valve means is provided for inflating and collapsing the bags at proper intervals of time.

Figure 16 illustrates one form of automatic valve means which may be utilized to accomplish this result. A valve 118 controls communication between the pipe 117 and the exhaust pipe 119, while a second valve 120 controls communication between the said pipe 117 and a compressed air supply pipe 121. Stems 122 extend downwardly from the respective valves and are provided at their lower ends with rollers 123 arranged to ride upon a slide 124. Springs 125 are interposed between the valve casings and collars 126 on the stems and normally force the rollers 123 into a yielding engagement with the face of the slide. This slide is provided with cam depressions 127, and projecting from one end of the slide is an arm 128 provided at its end with a roller 129. This roller is held in a yielding engagement with a cam 130 by means of a spring 131, said cam being shown as driven from the shaft 16. The slide 124 will thus be operated in timed relation to the other parts of the filter, and the cam depressions 127 in the slide 124 are arranged in such a manner that when the slide is moved in one direction the valve 120 is opened and the valve 118 closed, thereby placing the pipe 117 in communication with the compressed air supply pipe 121 and causing the flexible bags 115 to be inflated. When the slide 124 is moved in the opposite direction, the valve 120 is closed and the valve 118 opened, thereby exhausting the air from the bags 115 and causing the same to collapse. When the flexible bags 115 are inflated, as indicated by Figure 15, they are expanded into engagement with the cake C on opposite sides of the filter leaf section, and if desired, a pressure as high as one hundred pounds per square inch may be maintained against the cake. This squeezes the cakes tightly against the filter leaf sector and wrings out of them the surplus moisture which is drawn by suction through the pipe 7. When canvas is used for the bags 115, a certain amount of air will find its way through the fabric, and this will tend to help push the moisture through the cake into the interior of the filter leaf. When reinforced rubber bags are used, no compressed air will thus escape through the cake, and the material employed in forming the flexible bags may depend upon the character of the work to be done by the filter. Where rubber bags are used it may be advantageous under certain conditions to have the outer faces of the bags covered with canvas, or possibly just covered with cocoa matting and then with light canvas, so that a certain amount of air can be drawn through the cake by the suction of the leaf. Just before the intermittent driving mechanism is ready to rotate the filter leaf through a distance corresponding to the width of one of the segments, the automatic valve operates and places the bags in connection with a vacuum reservoir or exhaust. The bags thus immediately deflate and collapse, thereby giving the filter leaf ample clearance space to rotate. This positive application of pressure to the cake provides for removing the moisture therefrom in a most effective manner, and after being subjected to pressure the cake is removed by the scrapers, as previously described. Instead of compressed air it will be obvious that hydraulic or steam power might be utilized in operating the flexible bags, and it is to be understood that I do not limit myself to any particular means for applying this pressure to the filter cake, since this may be accomplished in any manner without departing from the spirit of the invention.

Figures 17 and 18 illustrate a filter of the rotary drum type which is constructed in accordance with the present invention. The drum D is rotatably mounted with the lower portion thereof extending into the filter tank 133. A mutilated gear construction identical with that shown by Figure 4 is utilized to impart a step by step or intermittent motion to the drum, and the periphery of the drum is divided into filter areas arranged between cleats 134 which extend longitudinally across the periphery of the drum at intervals and are utilized to secure the filter fabric 135 in position thereon, as indicated by Figure 19. A coarse screen 136 or the like is arranged under the filter fabric, and each filter area communicates through a radial pipe 137 with a longitudinal pipe 138 which is arranged at the hub of the drum and extends longitudinally thereof, said pipes 138 corresponding to the pipes 7 of the leaf filter previously described. That portion of the periphery of the drum which is rotated upwardly out of the filter tank is played upon by jets from nozzles 139, said nozzles being carried by arms 140 projecting from a pipe 141 which extends in a direction parallel to the axis of the drum. A flexible water supply pipe 142 communicates with the pipe 141, and this pipe is carried by brackets 143 projecting from a connecting rod 144 which is connected eccentrically to double disk members 145 arranged at opposite ends of the filter. These members 145 are journaled upon brackets 146 and the shafts 147 thereof have a chain and sprocket connection 148 so that the two disk members rotate in unison. A belt and pulley arrangement 150 is provided for driving one of the shafts 147, and it will be obvious that as the two disk members 145 are rotated the connecting rod 144 is given a combined reciprocating and lateral movement. This results in causing the nozzles 139 to play over the surface of the drum, each nozzle travelling in a substantially circular path. The spraying is thus distributed over the surface of the drum and a relative movement between the nozzles and drum obtained even during those periods of time when the drum is to be at rest.

The cake pressing means includes a flexible bag 151 which is arranged under a pressure plate 152 extending longitudinally over the top of the drum, said pressure plate being reinforced by a backing 153. A pipe 154 communicates with the flexible bag 151, and an automatic valve mechanism operating in timed relation to the movements of the filter, such as that shown by Figure 16, may be utilized for admitting compressed air or other fluid pressure medium to the bag for inflating the same to exert pressure upon the cake at proper intervals of time. Moisture is thus expelled from the cake in a most effective manner, in substantially the same way as previously described.

The cake from which the moisture has been thus squeezed is removed from the drum by a scraper 155 which is mounted to have a back and forth longitudinal movement. The pivot rod 156 carrying the scraper is slidable within the guide bearings 157, and a spring 158 is interposed between one end of the scraper and an abutment 159 and normally holds the other end of the scraper in engagement with a cam 160. The shaft 161 carrying this cam is journaled within a bearing 162 and has a belt and pulley connection 163 with a shaft 164 which is connected by gearing 165 to the motor shaft 19. With this construction it will be obvious that when the filter is in operation the cam 160 will be slowly rotated, and that the rotation of this cam will result in a longitudinal reciprocation of the scraper 155. This will cause the edge of the scraper to wear evenly and will also cause it to operate in a most effective manner to remove the cake from the drum.

As will be understood by those skilled in the art, the invention can be utilized in connection with any type of suction filter, and numerous mechanical means can be utilized for carrying out the ideas of the invention in different manners. I therefore, do not intend to limit myself to the specific applications and constructions of the invention set forth, but intend to claim my invention broadly, in whatever mode its principle may be employed.

Having thus described the invention, what I claim as new and desire to secure by Letters Patent, is:—

1. A filter comprising a tank, a filter element movable in said tank, and means for advancing the filter element with a step by step movement.

2. A filter comprising a tank, filter elements movable in said tank, means for associating said elements with a common central discharge, and means for advancing the element with an intermittent movement.

3. A suction filter including a movable filter element, and means for advancing the element with an intermittent movement and providing periods of rest between the movements.

4. A rotary suction filter in which the filter elements are advanced with an intermittent movement.

5. A rotary suction filter in which the filter elements are advanced with an intermittent movement.

6. A filter including filter elements movable into and out of the solution to be filtered, means for advancing the filter elements with an intermittent movement and providing periods of rest between the movements, and means for applying pressure to the cake during one of the periods of rest.

7. A filter including a filter element movable into and out of the solution to be filtered, means for advancing the filter elements with an intermittent movement and providing periods of rest between the movements, and means for applying exterior pressure to the cake during one of the periods of rest.

8. A filter including a filter element movable into and out of the solution to be filtered, means for advancing the filter element with an intermittent movement and providing periods of rest between the movements, and means for applying interior suction to the cake during one of the periods of rest.

9. A filter including filter elements movable into and out of the solution to be filtered, means for advancing the filter elements with an intermittent movement and providing periods of rest between the movements, and means for simultaneously applying exterior pressure and interior suction to the cake during one of the periods of rest.

10. A filter including filter elements movable into and out of the solution to be filtered, means for advancing the filter elements with an intermittent movement and providing periods of rest between the movements, means for applying pressure to the cake during one of the periods of rest, and means for actuating the pressure means in timed relation to the movements of the filter.

11. A rotary suction filter including filter elements, means for turning the filter with an intermittent movement and providing periods of rest between the movements, and inflatable and deflatable means applying pressure to the cake during one of the periods of rest.

12. A rotary suction filter including filter elements, means for turning the same with an intermittent movement and providing periods of rest between the movements, inflatable pressure means for squeezing the cake during one of the periods of rest, and means for simultaneously placing the filter element in communication with a source of vacuum.

13. A rotary suction filter including filter elements, means for turning the same with an intermittent movement and providing periods of rest between the movements, inflatable means for positively squeezing the cake from the outside thereof during one of the periods of rest, means for actuating the inflatable pressure means in timed relation to the movements of the filter, and valve means actuated in timed relation to the movements of the filter for simultaneously placing the filter element in communication with an exhaust chamber.

14. A rotary suction filter including filter elements, means for turning the same with an intermittent movement and providing periods of rest between the movements, a fixed plate arranged opposite the path of the filter elements, means mounted upon the fixed plate for advancing into engagement with the cake to squeeze the same during one of the periods of rest, and means for actuating the said squeezing means in timed relation to the movements of the filter.

15. A rotary suction filter including filter elements, means for advancing the filter elements with an intermittent movement and providing periods of rest between the movements, a fixed plate arranged opposite the path of the filter elements, an inflatable pressure element mounted upon the fixed plate and adapted to be expanded into a forcible engagement with the filter cake to squeeze the same during one of the periods of rest, and valve means actuated in timed relation to the movements of the filter for alternately placing the inflatable member in communication with a fluid pressure supply pipe and an exhaust pipe.

16. A rotary suction filter including spraying nozzles mounted to play upon the filter elements, means for moving the spraying nozzles relative to the filter elements, and means for applying pressure to said elements to dry the filter cake collected thereon.

17. A rotary suction filter including spraying nozzles mounted to play upon the surface of the filter elements, means for oscillating the spraying nozzles in planes substantially parallel to the surfaces of the filter elements, means for applying pressure to the surfaces of the filter elements to dry the cake thereon, and means for rendering said last-mentioned means operative when said spraying operation is completed.

18. A rotary suction filter including, means for intermittently rotating the filter elements, nozzles mounted to spray the filter elements, a frame carrying the nozzles, and means for oscillating the frame and causing the nozzles to move in a path substantially parallel to the filter elements.

19. A rotary suction filter including, means for intermittently rotating the filter elements, spraying nozzles mounted to play upon the filter elements, a frame carrying the nozzles, and means for positively oscillating the frame and nozzles and causing the nozzles to play back and forth across the face of the filter elements.

20. An intermittent rotary suction filter including spraying nozzles mounted to play upon the filter elements, a frame carrying the nozzles, and cam means driven in timed relation to the filter for moving the nozzles back and forth over the filter areas of the filter.

21. A rotary suction filter including spraying nozzles mounted to play upon the filter areas, a pair of rotary disks, a rod eccentrically connecting the two disks and carrying the nozzles, and means for driving the disks in unison to oscillate the nozzles over the filter areas.

22. A rotary suction filter including driving means for turning the filter with an intermittent movement and providing periods of rest between the movements, spraying nozzles mounted to play upon the rotary filter elements, a frame carrying the spraying nozzles, and means actuated in timed relation to the intermittent movements of the rotary filter to oscillate the frame and cause the nozzles to play over the filter areas.

23. A rotary suction filter including filter elements, means for advancing the filter elements with an intermittent movement and providing periods of rest between the movements, and means for inflating the filter elements during one period of movement.

24. A rotary suction filter including filter elements, means for advancing the filter elements with an intermittent movement and providing periods of rest between the movements, scrapers acting upon each filter element during one period of movement, and means for inflating the filter elements during the said period of movement, the filter element being uninflated during the corresponding period of rest.

25. A rotary suction filter including filter elements, means for turning the same with an intermittent movement and providing periods of rest between the movements, scrapers arranged to act upon each filter element during one of the periods of movement, and valve means controlled by the movements of the filter for inflating each filter element while it is being acted upon by the scrapers, the filter elements being uninflated at other times.

26. A rotary suction filter including a scraper for removing the cake, and means for reciprocating the scraper during the operation thereof.

27. A rotary suction filter including a scraper, and cam means driven in timed relation to the filter for reciprocating the scraper.

28. A rotary suction leaf filter including fixed plates arranged on opposite sides of the path of the suction leaf, means for advancing the filter with an intermittent movement and providing definite periods of rest between the movements, and opposed pressure means mounted upon the fixed plates for engaging the faces of the cake to squeeze the same during the periods of rest.

29. A rotary suction leaf filter including fixed plates mounted upon opposite sides of the path of the filter leaf, means for advancing the filter with an intermittent movement and providing periods of rest between the movements, flexible bags on the fixed plates, and means for inflating the bags during the periods of rest for causing them to squeeze the cake on opposite sides of the filter leaf.

30. A rotary leaf filter including fixed plates arranged upon opposite sides of the path of the filter leaf, means for rotating the leaf with an intermittent movement and providing periods of rest between the movements, flexible bags applied to the fixed plates, valve means for alternately placing the bags in communication with a fluid pressure supply pipe and an exhaust pipe to inflate and deflate the same, said bags acting when inflated to press against the cake on opposite sides of the filter leaf, and means for actuating the valve means in timed relation to the movements of the filter.

31. A rotary suction filter including scraping means for removing a cake from the filter, valve means actuated in timed relation to the filter for controlling the discharge of the cake or sludge valve actuating means including adjustable means for varying the time that the valve is held open, relatively to the time it is held closed.

32. A rotary suction filter including scrapers for removing the cake from the filter, conveying means for moving the discharged cake to an outlet, a poppet valve for controlling the outlet, and means for adjusting the period of operation of the said valve.

33. A suction filter including a rotary filter element, and mutilated gearing for driving the same with an intermittent movement.

34. A suction filter including a rotary element, a gear thereon, a mutilated gear meshing with the said gear, a worm gear rigid with the mutilated gear, and a worm for driving the worm gear, the mutilated gear causing the filter member to be advanced with an intermittent movement.

35. A continuous rotary suction filter including means for drying the cake by applying pressure to the exterior thereof while still in position upon the filter, and means for subsequently removing the cake.

ERNEST J. SWEETLAND.